United States Patent [19]

Hisanaga et al.

[11] Patent Number: 5,030,409
[45] Date of Patent: Jul. 9, 1991

[54] END PORTION-TREATING METHOD FOR SYNTHETIC RESIN FILM AND DEVICE THEREFOR

[75] Inventors: Akinori Hisanaga, Takasago; Takashi Sakubata; Tetsuo Yoshioka, both of Ohtsu, all of Japan

[73] Assignee: Kanegafuchi Kagaku Kogyo Kabushiki Kaisha, Osaka, Japan

[21] Appl. No.: 305,681

[22] Filed: Feb. 3, 1989

[30] Foreign Application Priority Data

Feb. 4, 1988 [JP] Japan ................... 63-25387

[51] Int. Cl.⁵ ............................. B29C 39/42
[52] U.S. Cl. .................. 264/556; 264/216; 264/237; 425/72.1; 425/224; 425/326.1; 425/387.1
[58] Field of Search ............ 264/216, 556, 237; 425/72.1, 224, 387.1, 326.1

[56] References Cited

U.S. PATENT DOCUMENTS

| | | | |
|---|---|---|---|
| 3,121,915 | 2/1964 | Heller, Jr. | 264/556 |
| 3,141,194 | 7/1964 | Jester | 264/556 |
| 3,597,515 | 8/1971 | Widiger | 264/556 |
| 4,874,571 | 10/1989 | Müller | 425/72.1 |

FOREIGN PATENT DOCUMENTS

| | | |
|---|---|---|
| 0139089 | 5/1985 | European Pat. Off. |
| 536839 | 10/1931 | Fed. Rep. of Germany |
| 2129147 | 6/1971 | Fed. Rep. of Germany |
| 62-207624 | 9/1987 | Japan ................ 264/237 |

*Primary Examiner*—Jeffery Thurlow
*Attorney, Agent, or Firm*—Armstrong, Nikaido, Marmelstein, Kubovcik & Murray

[57] ABSTRACT

An end portion-treating method and apparatus for manufacturing a synthetic resin film by first extruding through a slit die or coating with the use of a coater onto or on a conveyor belt or drum a fluid synthetic resin composition in a smooth layer form, and then solidifying it. Gas is blown at both end portions of the film of the fluid synthetic resin composition extruded onto the surface of the conveyor belt or drum to change the sectional form of both end portions. A synthetic resin film is obtained without creasing in the process of drying or cooling of the film or lifting of the film off the surface of the conveyor belt. A film of superior quality is thus provided. Also, since both longitudinal end portions of the film need not be trimmed off and discarded, the film manufacturing effifiency is improved, and the manufacturing cost is reduced substantially.

6 Claims, 7 Drawing Sheets

END PORTION-TREATING METHOD FOR SYNTHETIC RESIN FILM AND DEVICE THEREFOR

BACKGROUND OF THE INVENTION

1. Field of the Invention

The present invention relates to a manufacturingg method for a synthetic resin film and a device therefor, particularly to a method of treating the longitudinal side end portions (hereinafter referred to as "end portions") in the process of manufacturing a synthetic resin film and a device therefor.

2. Description of the Prior Art

A synthetic resin film such as polyimide film and polyethylene film has usually been manufactured to date by a method of first continuously extruding or applying its material, namely a fluid synthetic resin composition, in a smooth, thin film form (approximately 10–1,000 μm) onto a conveyor belt or drum through a slit die or by the use of an applicator and then solidifying it by drying, heating or cooling.

In this manufacturing method, however, as shown in FIG. 18, for example, although the film of a fluid synthetic resin composition 2 extruded through a slit die 1 is continuously placed on a conveyor belt 3, both longitudinal end portions of the film 2 of the fluid synthetic resin are then caused to shrink by the influence of surface tension or the like and this results in formation of thick-walled portions 5, as illustrated in FIG. 19. The thick-walled portions 5 and the flat portion 6 in between of the film 2 are different in shrinkage ratio as the film 2 is solidified, the thick-walled portions 5 along both longitudinal end portions of the film 2 tend to be lifted off the surface of the conveyor belt or drum to cause shrinkage sideways to possibly interfere with manufacture of the synthetic resin film. Also, this lifting off the conveyor belt or drum surface of the film sometimes causes sideway creasing of the synthetic resin film.

For elimination of such sideway creases it was a usual practice to trim off both end portions of the synthetic resin film. The width of the strips to be trimmed off is then substantial, and the resultant decrease in yield was bound to be reflected on the film's manufacturing cost.

SUMMARY OF THE INVENTION

It is a primary object of the present invention to provide a method for manufacturing a synthetic resin film superior in quality under avoidamce of the aforementioned troubles of the synthetic resin film lifting off the conveyor belt or drum surface as well as sideway creasing thereof and a device therefor.

Further objects and advantages of the invention will become apparent to those skilled in the art from reading of the detailed description below.

After extensive and intensive studies the present inventors have discovered the aforementioned object can be accomplished by blowing a gas at both end portions of a film of a fluid synthetic resin formed by extrusion or coating to thus change the sectional form thereof as desired and could accomplish the invention.

BRIEF DESCRIPTION OF THE DRAWINGS

FIGS. 11–13 are views showing nozzles of different configurations, of which FIG. 11 is a partially cutaway side elevation, while FIGS. 12 and 13 are front elevations.

FIGS. 14–16 are views showing other examples of the film end portion-treating device of the invention, of which FIG. 14 is a partially cutaway enlarged view of the essential parts showing a modification of the device of FIG. 5, while FIGS. 15 and 16 are enlarged views showing the nozzle portion of the device of FIG. 6.

DETAILED DESCRIPTION OF THE INVENTION

The synthetic resin film end portion-treating method of the present invention is aimed at modifying as desired the sectional form in the end portions of the synthetic resin film in the process of manufacture thereof by blowing a gas at both end portions of the fluid film of synthetic resin composition just formed by extrusion onto or coating on a conveyor belt or drum.

The device of the invention for the synthetic resin film end portion-treatment by the aforementioned method comprises a pressure source and a single or plural nozzle/s for blowing at end portions of the fluid film of the synthetic resin composition just formed by extrusion onto or coated on the conveyor belt or drum a gas of a pressure higher than the atmospheric pressure (hereinafter called "high pressure gas") led from the above-mentioned pressure source.

The film end portion-treating method of the present invention consists in blowing a high pressure gas led from the pressure source through nozzle/s at the edge portions of the film of a fluid synthetic resin composition continuously extruded onto or coated on a conveyor belt or drum for modification as desired of the sectional form in the edge portions of the film thickened or increased in wall thickness due to the influence of surface tension etc. in the direction which can be changed as necessary by a direction changing means so as to have the film of a fluid synthetic resin composition closely fitted to the surface of the conveyor belt or drum. Further, this method allows the film of a fluid synthetic resin composition to be solidified in the state closely fitted to the surface of the conveyor belt or drum, that is, with no indication of the edge portions lifting off and increase of the film's wall thickness in the end portions can be prevented without fail as well as sideway creasing in the same portions due to difference in shrinkage ratio.

Now, referring to the appended drawings, preferred embodiments of the present invention are described in detail.

Figure 2:
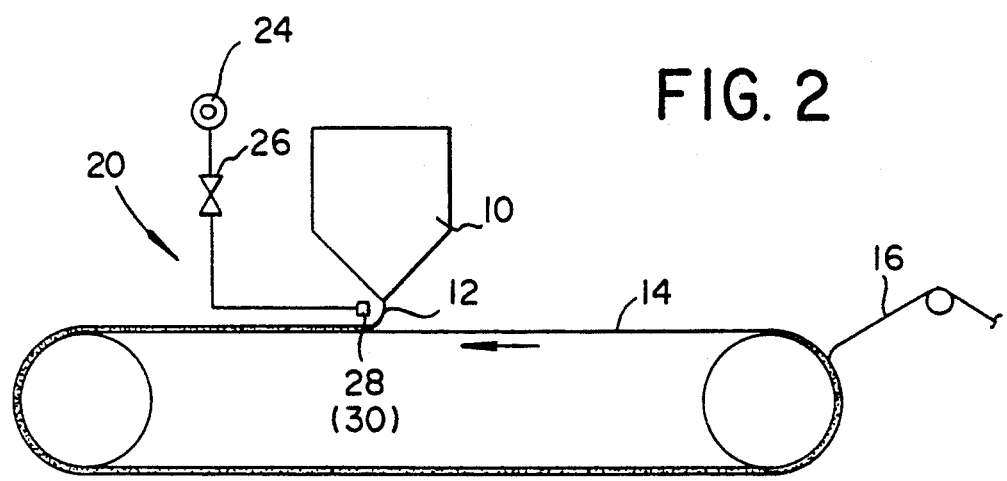
FIG. 2 is a view showing the conception of the invented method.

In FIG. 2, the numeral 10 represents a slit die, to which a fluid synthetic resin composition is supplied by a mixer (not shown) and this fluid synthetic resin composition is continuously extruded through the slit die 10. The extruded film 12 of a fluid synthetic resin composition is placed on an endless conveyor belt 14 circulating at the same as or higher than the extruding speed and the film 12 is then solidified on the conveyor belt 14. The fluidized resin composition is then solidified in film form on the conveyor belt by allowing or causing the solvent to evaporate when the fluid synthetic resin composition is acrylate resin, acetate resin, triacetate resin, imide resin etc., which are made into film form by the so-called solution casting method, or by cooling when it is a thermoplastic resin such as polyvinyl chloride resin, polyester resin or polystyrene resin. The solidified film 12 is peeled off the conveyor belt 14 as a synthetic resin film 16 and is rolled up on a roller after any aftertreatment as necessary.

Figure 1:
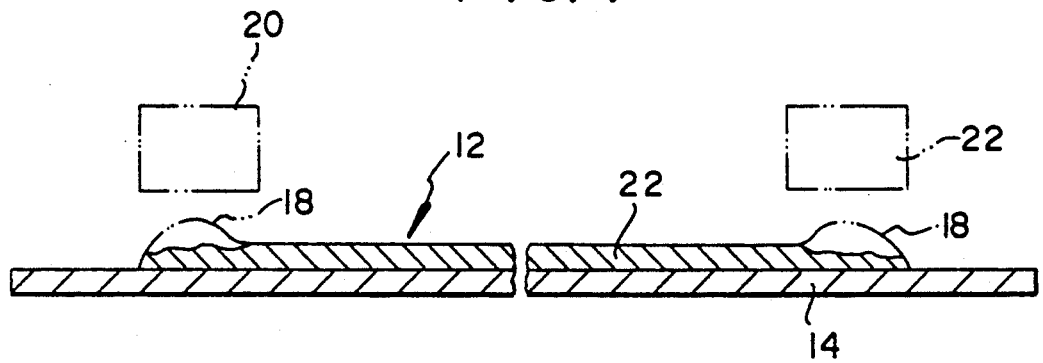
FIG. 1 is a sectional view of the essential parts for explanation of the method of the present invention.
Figure 3:
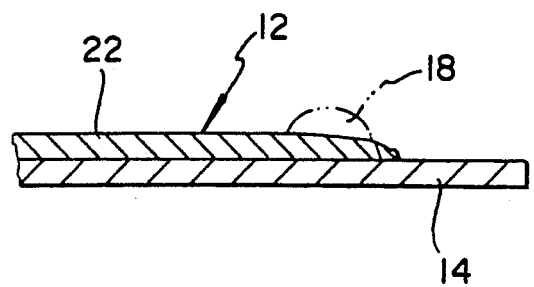
FIG. 3 is an enlarged sectional views of the essential parts showing the sectional form of the end portion of a synthetic resin film manufactured by the invented method.

Both longitudinal end portions 18 of the film 12 of a fluid synthetic resin composition extruded onto the conveyor belt 14 are caused to be in a raised form as indicated by a two-dot chain line in FIG. 1 by the influence of surface tension or the like. The invented method consists in directing a gas flow from an end portion-treating device 20 at each of both end portions 18 to have the film 12 made thinner toward both ends with the sectional form thereof adjusted as desired. The sectional form in each of both end portions may be made concavo-convex or, as shown in FIG. 3, progressively smaller in height toward the end, and the film 12 is caused thereby to adhere closely to the conveyor belt 14 and also to be safe from sideway creasing due to difference in shrinkage ratio between the end portions and the portion in between.

As the gas to be blown out by the end portion-treating device 20, there may be used, besides air, also carbon dioxide, nitrogen and the like, and this end portion-treating device 20 comprises a pressure source 24 such as a gas bomb and an air reservoir, to which air is supplied compressed by a compressor or the like, a nozzle 28 to which the high pressure gas is supplied via a valve 26, and a flow direction changing means 30 to change the direction of the gas blown out through the nozzle 28. The pressure source 24 is for supplying a gas under a constant pressure (a pressure higher than the atmospheric pressure), and the valve 26 is for adjusting that constant gas pressure as necessary, at the same time controlling the pressure or flow rate of the gas being blown out through the nozzle 28.

Figure 4:
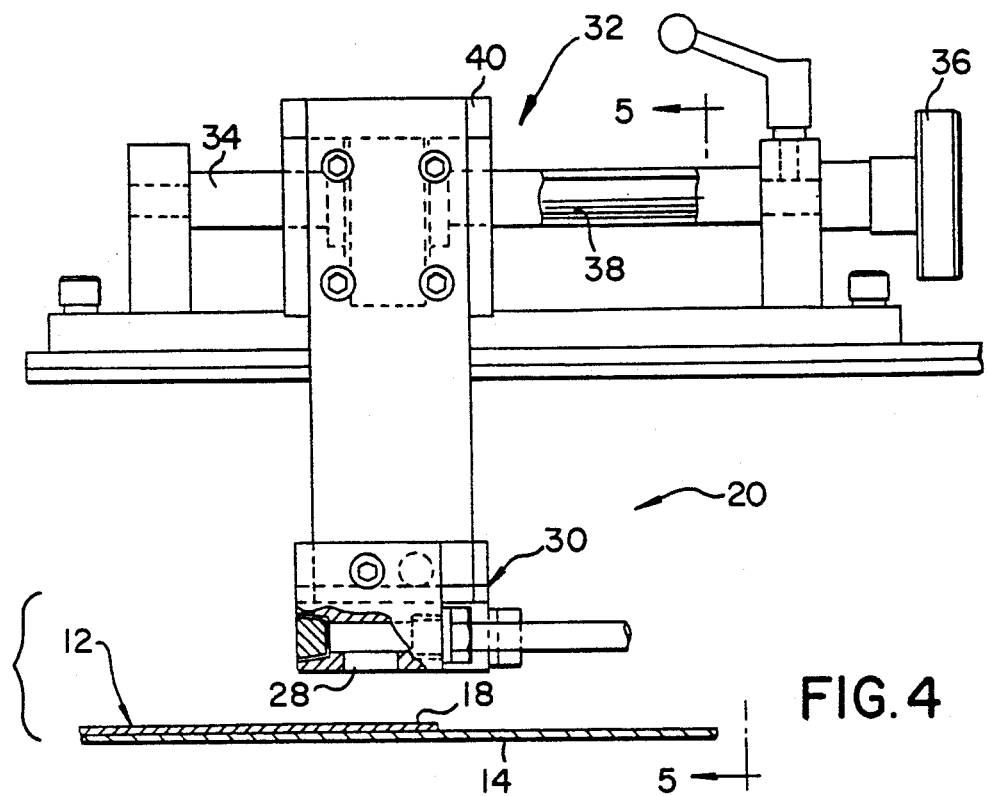
FIG. 4 is a partially cutaway front elevation of a device for film end portion-treatment showing an embodiment of the invention.
Figure 5:
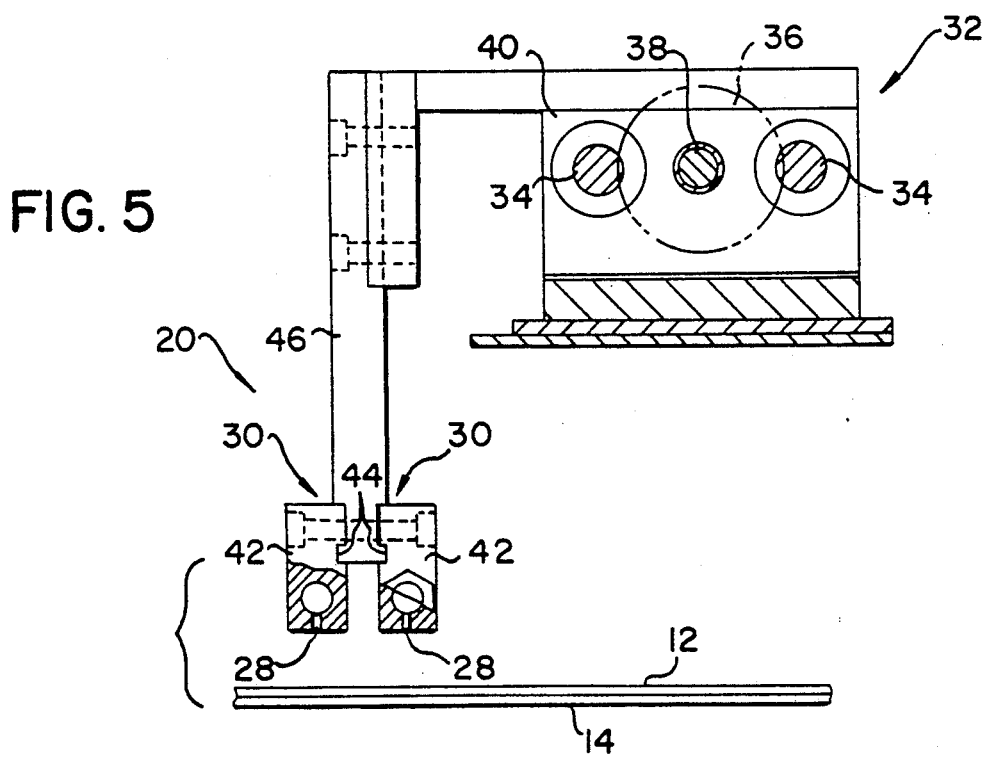
FIG. 5 is a sectional view of the invented device taken along the line V—V of FIG. 4.

The end portion-treating device 20 is so arranged that its nozzle 28 and the direction changing means 30 are attached to a positioning device 32, as an example thereof is shown in FIG. 4 and FIG. 5. The positioning device 32 has screwed thereinto a pair of guide rods 34 and screws and is made up of a threaded member 38 rotated by a handle 36 attached to one end thereof and a moving member 40 which is caused to move along the guide rod 34 as the threaded member 38 rotates, so that the nozzle 28 and the direction changing means 30 are positioned immediately thereafter corresponding to the change in dimensions of the synthetic resin film 16 (film 12) to be manufactured.

The nozzle 28 is formed as a slit and the gas is blown approximately perpendicularly downward as linear streams. A rectangular member 42 constituting the nozzle 28 has formed therein a groove 44, and it is so arranged that the rectangular member 42 can move with respect to the supporting member 46 to which it is attached. Hence, a pair of nozzles 28 are capable of changing the positions in the end portions of the film of a fluid synthetic resin composition 12 at which the gas streams are directed.

Thus, in this embodiment the gas streams blown out substantially perpendicularly downward for the edge portions 18 of the film 12 to be spread thereby so that there is no longer any risk of creases being caused by the difference in shrinkage ratio as the film 12 is solidified and, moreover, the film 12 is caused to adhere to the surface of the conveyor belt 14.

An embodiment of the invention has been described above, but it does not mean that the invention is limited thereto.

Figure 6:
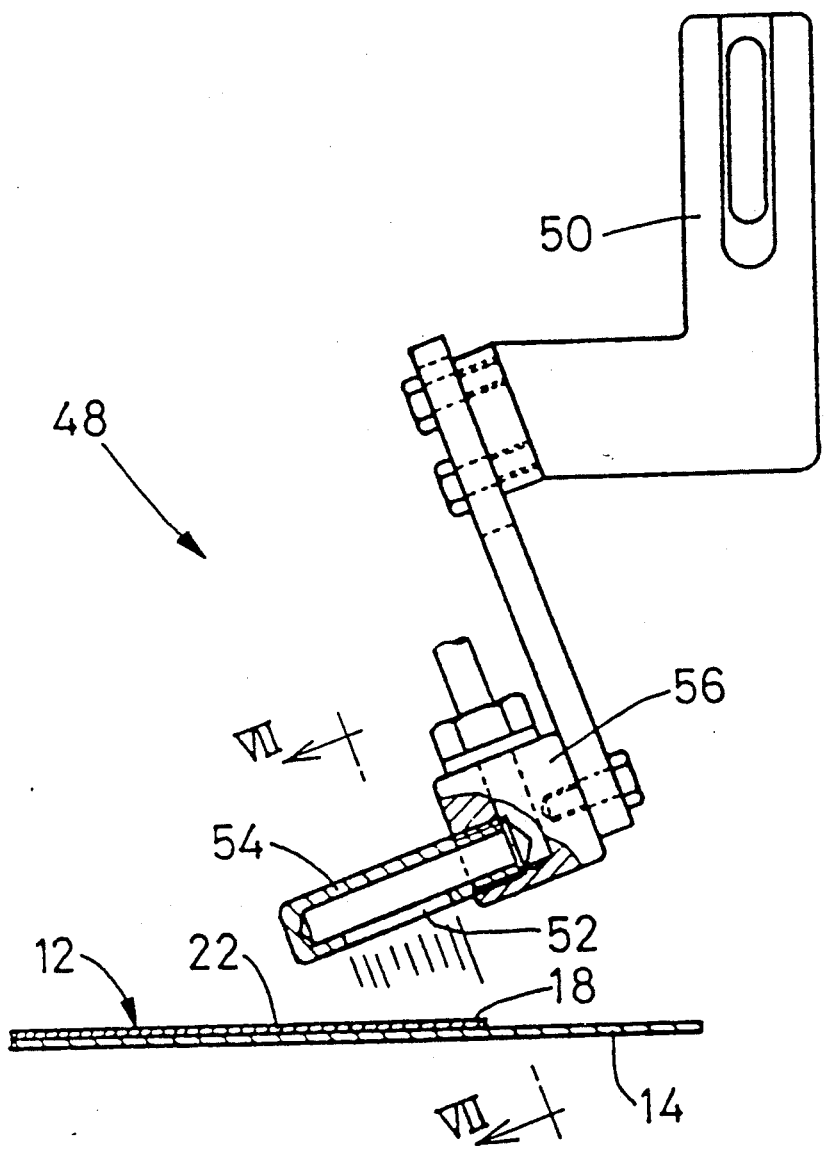
FIG. 6 is partially cutaway front elevation of a device for film end portion-treatment showing another embodiment of the invention.
Figure 7:
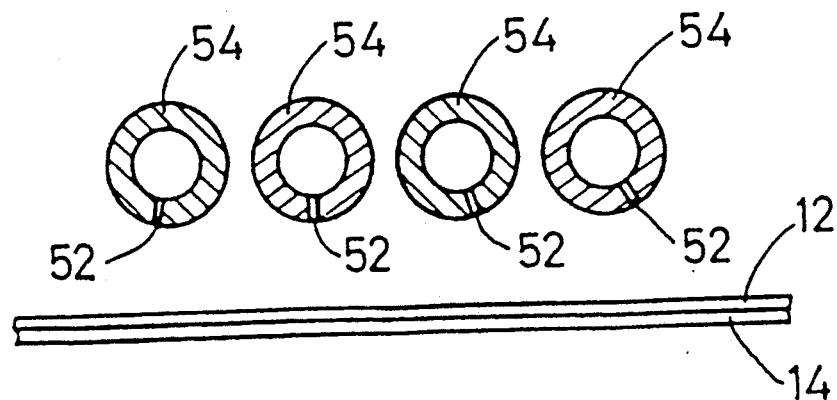
FIG. 7 is a sectional view of the invented device taken along the line VII—VII of FIG. 7.

For example, in another embodiment shown in FIG. 6, an end portion-treating device 48 is fixedly secured to a supporting member 50 so formed that it can be attached to a positioning device at the desired angle. Nozzles 52 of the end portion-treating device 48 have their apertures formed on one side of a cylinder 54 as slits along its axis and, as shown in FIG. 7, there are arranged 4 nozzles 52. The cylinder 54 having the nozzles 52 formed therein is attached to a holding member 56 to be freely rotatable in the peripheral direction with respect thereto and, as shown in FIG. 7, it is so arranged that the direction of the gas streams out of the nozzles 52 can be properly set or adjusted.

In this embodiment the width and length of the slit of the nozzle 52 may be made different from nozzle to nozzle, and it is also possible to have the pressure or flow rate of the high pressure air supplied to the individual nozzles 52 controllable by means of the valve 26.

In this embodiment the gas streams can be directed freely for efficient blowing at the end portions 18, hence the sectional form of the end portions 18 can be made to be as desired. Moreover, the gas streams out through the nozzles 52 are directed at the end portions 18 of the film 12, and it is seldom the case that the flat portion 22 in between of the film 12 is affected thereby.

Figure 8:
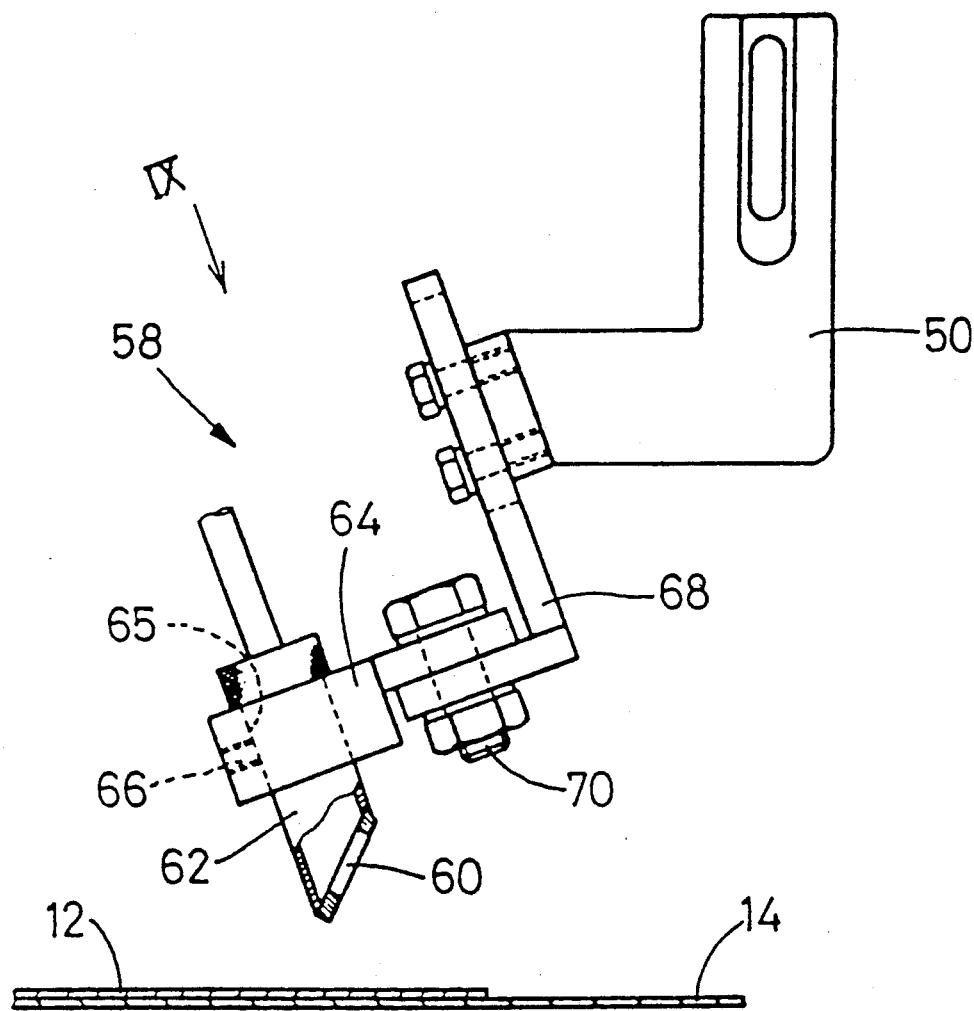
FIG. 8 is a partially cutaway front elevation of a device for film end portion-treatment showing still another embodiment of the invention.
Figure 9:
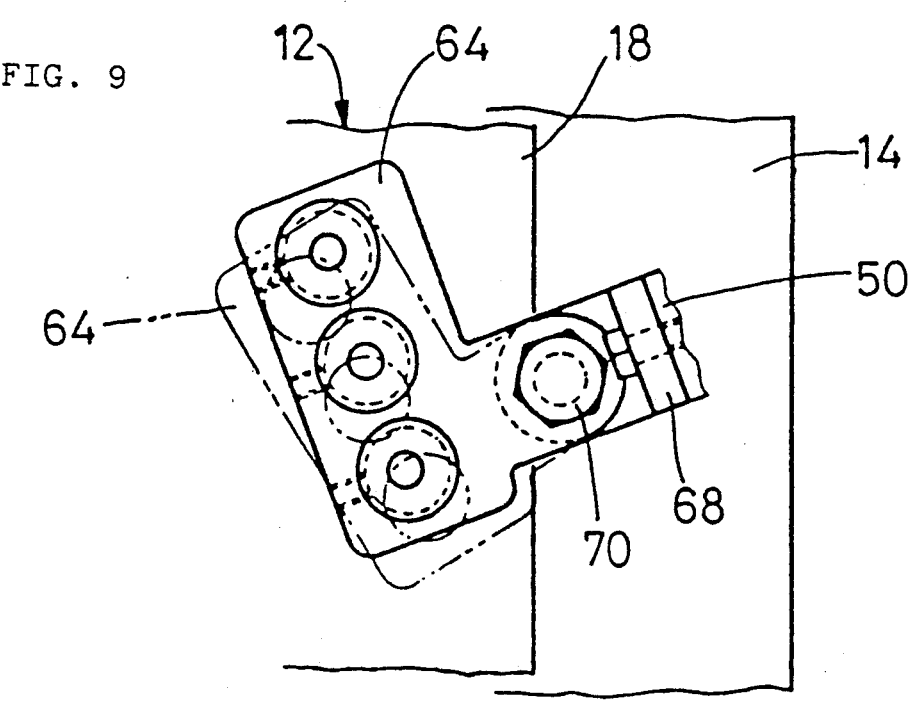
FIG. 9 is a view taken in the direction of the arrow IX in FIG. 8.
Figure 10A:
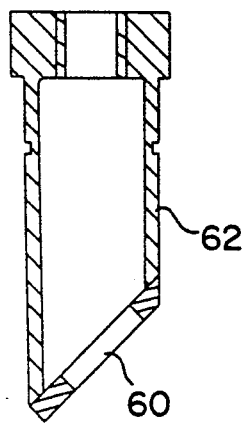
FIG. 10 consists of two views for illustration of the nozzle shown in FIG. 8, of which FIG. 10 (a) is a side sectional elevation and FIG. 10 (b) is a front elevation.
Figure 10B:
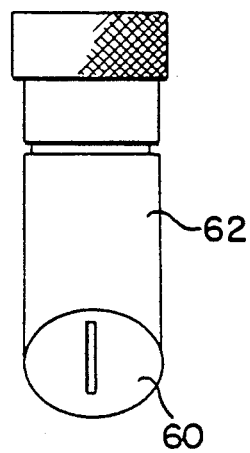

As shown in FIGS. 8 through 10, a nozzle 60 of an end portion-treating device 58 is formed by cutting a cylinder 62 at one end diagonally, and forming a slit in the plate used for closing the cut end. The cylinder 62 is set through a bore 65 made through a holding member 64 to be freely rotatable and, after setting of the direction of the gas stream out of the nozzle 60, the cylinder 62 is fixed to the holding member 64 by means of screws 66. Meanwhile, the holding member 64 is, as shown by the two-dot chain line in FIG. 9, is attached to an auxiliary member 68 secured to the holding member 50 to be freely rotatable with a screw 70 as the center, so that the gas streams out of the nozzles 60 are directed at the required positions of the edge portions 18 of the film 12.

Figure 11:
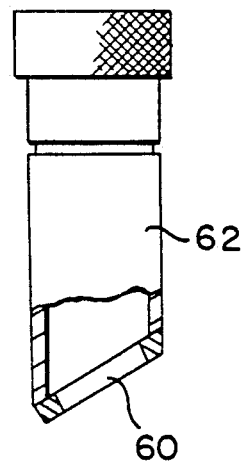
Figure 12:
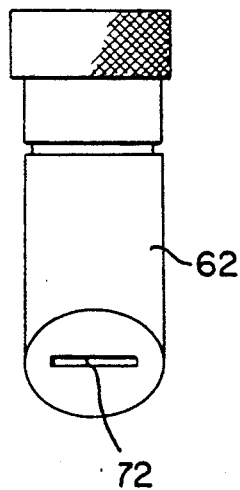
Figure 13:
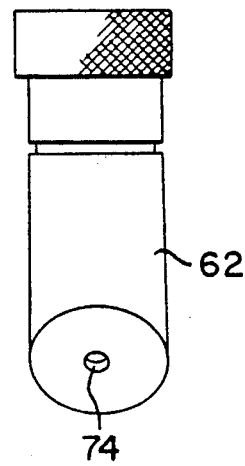

In this embodiment the angle of the nozzles 60 formed in the cylinder 62 is not necessarily as shown in FIGS. 8 and 10 and, for instance, may be less steep as shown in FIG. 11, or may as well be approximately 90 degrees against the nozzles 60 as in the preceding embodiment shown in FIG. 10 and, further, it is possible to make the nozzles 74 as small holes as shown in FIG. 13. Furthermore, it is also possible to properly combine various nozzles such as 60, 72 and 74.

Figure 14:
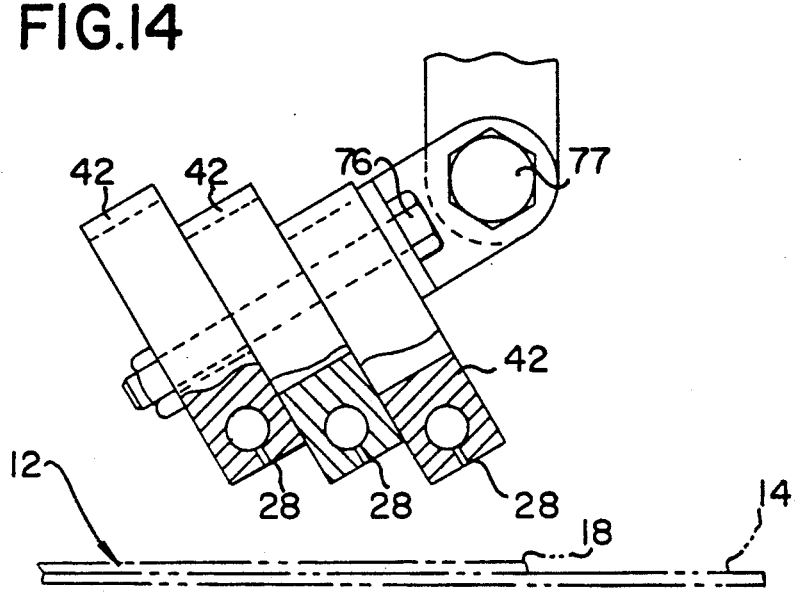

It is also possible, as shown in FIG. 14, to arrange a plurality of the rectangular members 42 with the aforementioned nozzles 28 formed therein continued diagonally, so as to adjust the gas blowing direction of the nozzles 28 by means of the screws 76 and 77.

Figure 15:
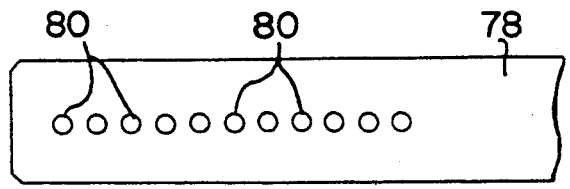
Figure 16:
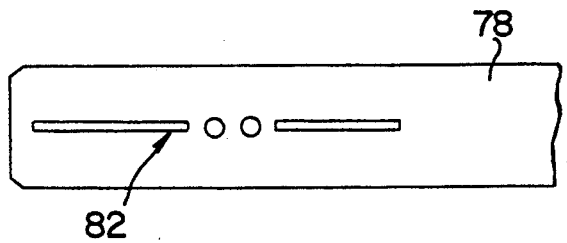

As shown in FIG. 15, it is as well possible to have a plurality of nozzles 80 consisting of small holes in the cylindrical member 78 and, as shown in FIG. 16, it is also possible to form a nozzle as a combination of slits and small holes.

Figure 17A:
FIG. 17 (a), (b), (c) are illustrative views showing different configurations of the nozzle aperture shown in FIGS. 4, 6, 8 and 10–12
Figure 17B:
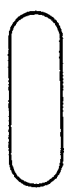
Figure 17C:
Figure 18:
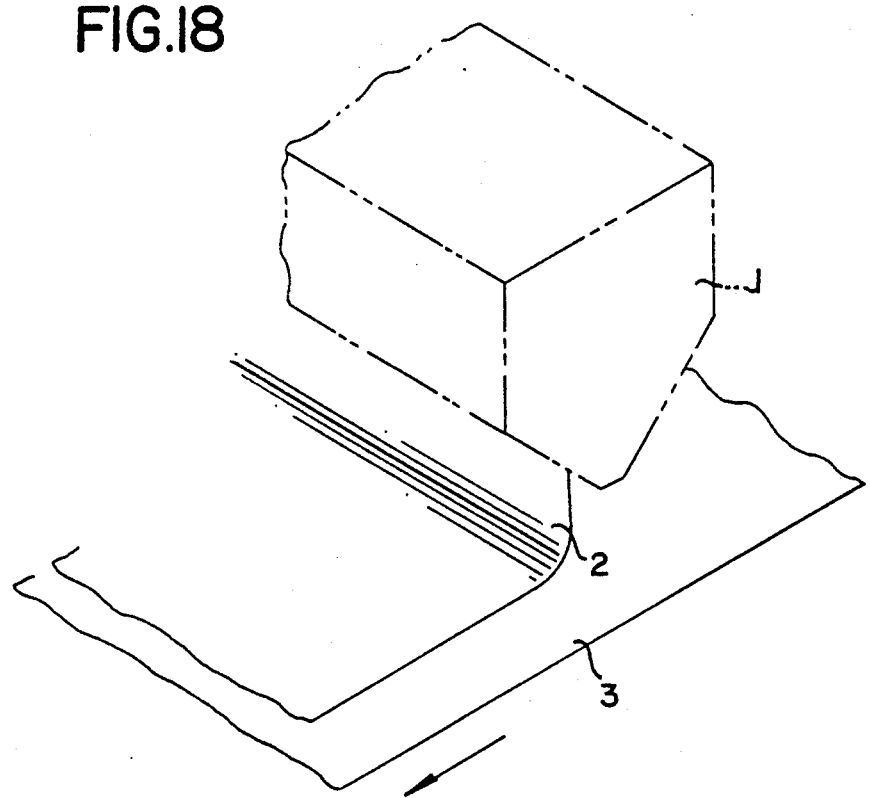
FIG. 18 is a schemative view for illustration of a conventional method of manufacturing a synthetic resin film.
Figure 19:
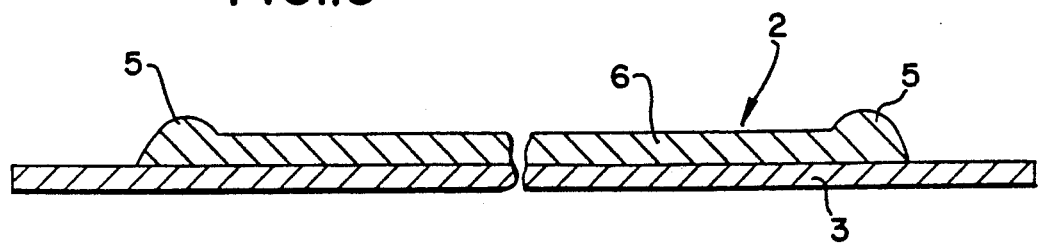
FIG. 19 is a sectional view of the essential parts showing the defect of the synthetic resin film manufactured by the conventional method.
Figure 1:
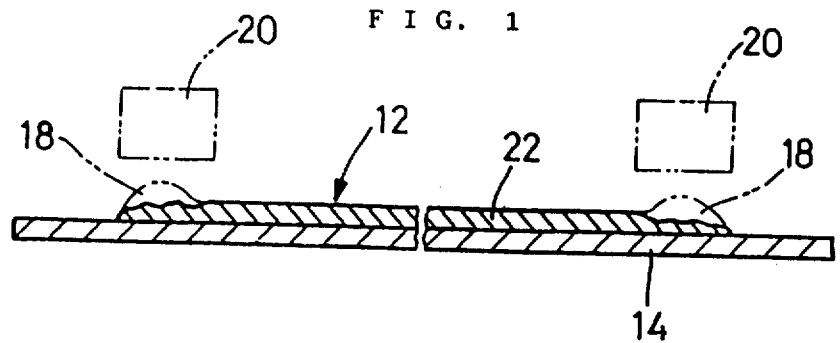
Figure 2:
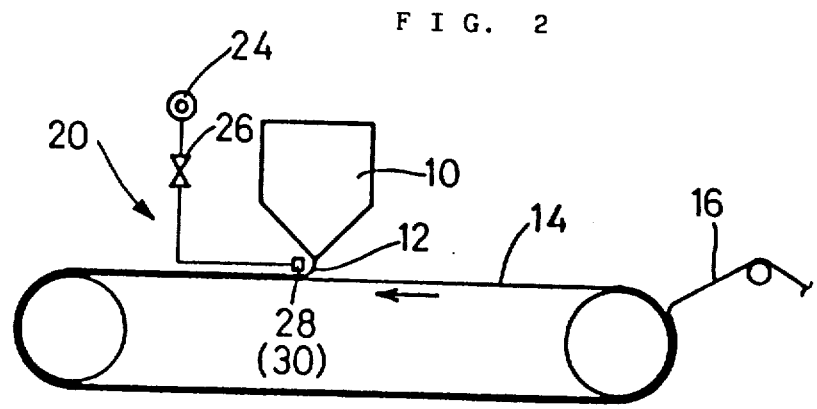
Figure 3:
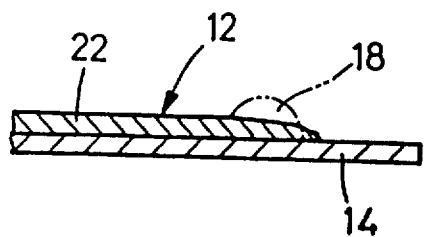

Further, it is also possible to make the form of nozzle aperture not in a single rectangular form but in desired forms as shown in FIG. 17 so as to make the sectional form of the end portions of the film 12 still closer to the desired one.

Although in the above description of the present invention, explanation was made of the case where a film of a fluid synthetic resin composition is extruded onto the belt conveyor, but this invention is well applicable to the case where a film is extruded onto a cylindrical drum. This invention is applicable not only where a fluid synthetic resin composition is extruded through a slit die but also where it is coated by casting by means of a coater to form a film on a conveyor belt or drum surface, when the thick-walled portions are bound to be formed as well in the end portions, and the device of the present invention is applicable as it is, that is, without any modification.

As the means of changing the gas flow direction it is also possible to use a flexible pipe or universal joint and it is not necessarily needed to provide a plurality of nozzles but it may as well be a single one. Thus, the method of the present invention as well as the device therefor may be practiced in modes or forms modified, improved or revised on the basis of the knowledges of those skilled in the art without departing from the purport of the invention.

The end portion-treating method for a synthetic resin film according to the invention as well as the device therefor consists in blowing a gas at the end portions of the film of a fluid synthetic resin composition for changing the sectional form of both end portions thereof, hence ensures against creasing or lifting off the conveyor belt etc. of the film and thus enables to manufacture a synthetic resin film superior in quality. Moreover, normally inevitable creasing in the end portions can be prevented without fail, hence there is no need of trimming off the end portions, this resulting in an improved yield and lowered manufacturing cost of any synthetic resin film.

While the invention has been particularly shown and described in reference to preferred embodiments thereof, it will be understood by those skilled in the art that changes in form and details may be made therein without departing from the spirit and scope of the invention.

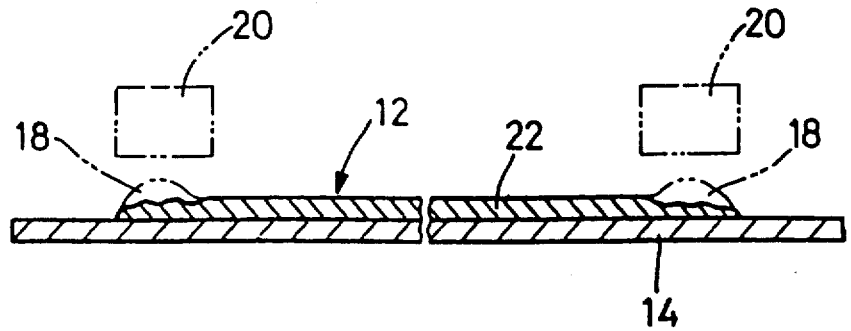

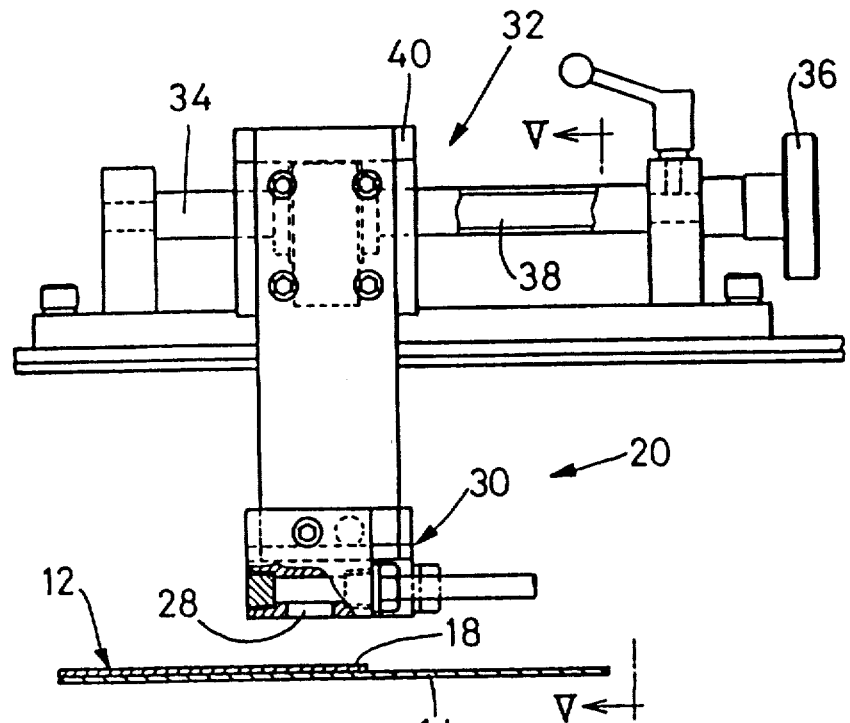
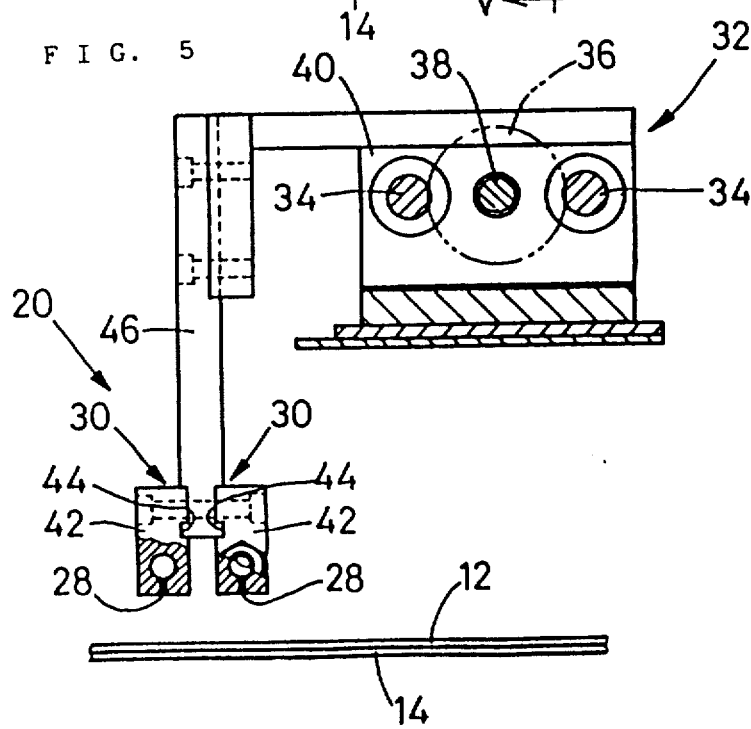

What is claimed is:

1. An end portion-treating method for use in a manufacturing process of a synthetic resin film comprising the steps of:
   depositing a thin-layered film of a fluid synthetic resin composition on the surface of at least one of a conveyor belt and a drum;
   solidifying said resin composition film; and
   changing the sectional form of end portions of said resin composition film deposited on at least one of said conveyor belt and said drum to a desired form, said step of changing including the step of changing the sectional form of end portions of said resin composition film towards a lateral direction relative to and away from a center line of said resin composition film to thereby form said end portions of said resin composition film thinner than intermediate portions of said resin composition deposited on at least on of said conveyor belt and said drum.

2. A device for an end portion-treatment of a synthetic resin film for use in an equipment for manufacturing a synthetic resin film comprising:
   an extrusion means for extruding a thin-layer of a fluid synthetic resin composition onto the surface of at least one of a conveyor belt and a drum; and
   source means for directing a high pressure gas at end portions of said layer of said resin composition, wherein said source means has at least one nozzle through which said high pressure gas passes, and wherein said source means directs said high pressure gas towards a lateral direction relative to and away from a center line of said layer of said resin composition to thereby form said end portions of said resin composition film thinner than intermediate portions of said resin composition deposited on at least one of said conveyor belt and said drum.

3. A device for end portion-treatment according to claim 2 further comprising a direction changing means for changing the direction of said high pressure gas from said at least one nozzle.

4. A device for end portion-treatment according to claim 2 or 3, wherein said nozzle is formed as a slit, small holes or a combination of slits and small holes.

5. A device for end portion-treatment according to any of claims 2 or 3, wherein said fluid synthetic resin composition is at least one of a 2-part liquid hardening resin, a thermosetting resin and a thermoplastic resin.

6. A device for end portion-treatment according to claim 4, wherein said fluid synthetic resin composition is at least one of a 2-part liquid hardening resin, a thermosetting resin and a thermoplastic resin.

* * * * *

UNITED STATES PATENT AND TRADEMARK OFFICE
CERTIFICATE OF CORRECTION

PATENT NO. : 5,030,409

DATED : July 9, 1991

INVENTOR(S) : Akinori Hisanaga et al

It is certified that error appears in the above-identified patent and that said Letters Patent is hereby corrected as shown below:

The title page, should be deleted to be replaced with the attached title page.

The drawing sheet 2 of 7, consisting of Fig. 4, should be deleted to be replaced with the drawing sheet, consisting of Fig. 4, as shown on the attached page.

Column 1, line 9, "manufacturingg" should read -- manufacturing--.

line 50, "avoidamce" should read --avoidance--.

Signed and Sealed this

Twenty-seventh Day of April, 1993

Attest:

MICHAEL K. KIRK

*Attesting Officer*     *Acting Commissioner of Patents and Trademarks*

United States Patent [19]

Hisanaga et al.

[11] Patent Number: 5,030,409
[45] Date of Patent: Jul. 9, 1991

[54] END PORTION-TREATING METHOD FOR SYNTHETIC RESIN FILM AND DEVICE THEREFOR

[75] Inventors: Akinori Hisanaga, Takasago; Takashi Sakubata; Tetsuo Yoshioka, both of Ohtsu, all of Japan

[73] Assignee: Kanegafuchi Kagaku Kogyo Kabushiki Kaisha, Osaka, Japan

[21] Appl. No.: 305,681

[22] Filed: Feb. 3, 1989

[30] Foreign Application Priority Data

Feb. 4, 1988 [JP] Japan ................. 63-25387

[51] Int. Cl.⁵ .................................................. B29C 39/42
[52] U.S. Cl. .................................. 264/556; 264/216; 264/237; 425/72.1; 425/224; 425/326.1; 425/387.1
[58] Field of Search ............... 264/216, 556, 237; 425/72.1, 224, 387.1, 326.1

[56] References Cited

U.S. PATENT DOCUMENTS

| | | | |
|---|---|---|---|
| 3,121,915 | 2/1964 | Heller, Jr. | 264/556 |
| 3,141,194 | 7/1964 | Jester | 264/556 |
| 3,597,515 | 8/1971 | Widiger | 264/556 |
| 4,874,571 | 10/1989 | Müller | 425/72.1 |

FOREIGN PATENT DOCUMENTS

| | | |
|---|---|---|
| 0139089 | 5/1985 | European Pat. Off. |
| 536839 | 10/1931 | Fed. Rep. of Germany |
| 2129147 | 6/1971 | Fed. Rep. of Germany |
| 62-207624 | 9/1987 | Japan ................. 264/237 |

Primary Examiner—Jeffery Thurlow
Attorney, Agent, or Firm—Armstrong, Nikaido, Marmelstein, Kubovcik & Murray

[57] ABSTRACT

An end portion-treating method and apparatus for manufacturing a synthetic resin film by first extruding through a slit die or coating with the use of a coater onto or on a conveyor belt or drum a fluid synthetic resin composition in a smooth layer form, and then solidifying it. Gas is blown at both end portions of the film of the fluid synthetic resin composition extruded onto the surface of the conveyor belt or drum to change the sectional form of both end portions. A synthetic resin film is obtained without creasing in the process of drying or cooling of the film or lifting of the film off the surface of the conveyor belt. A film of superior quality is thus provided. Also, since both longitudinal end portions of the film need not be trimmed off and discarded, the film manufacturing efffiency is improved, and the manufacturing cost is reduced substantially.

6 Claims, 7 Drawing Sheets